UNITED STATES PATENT OFFICE.

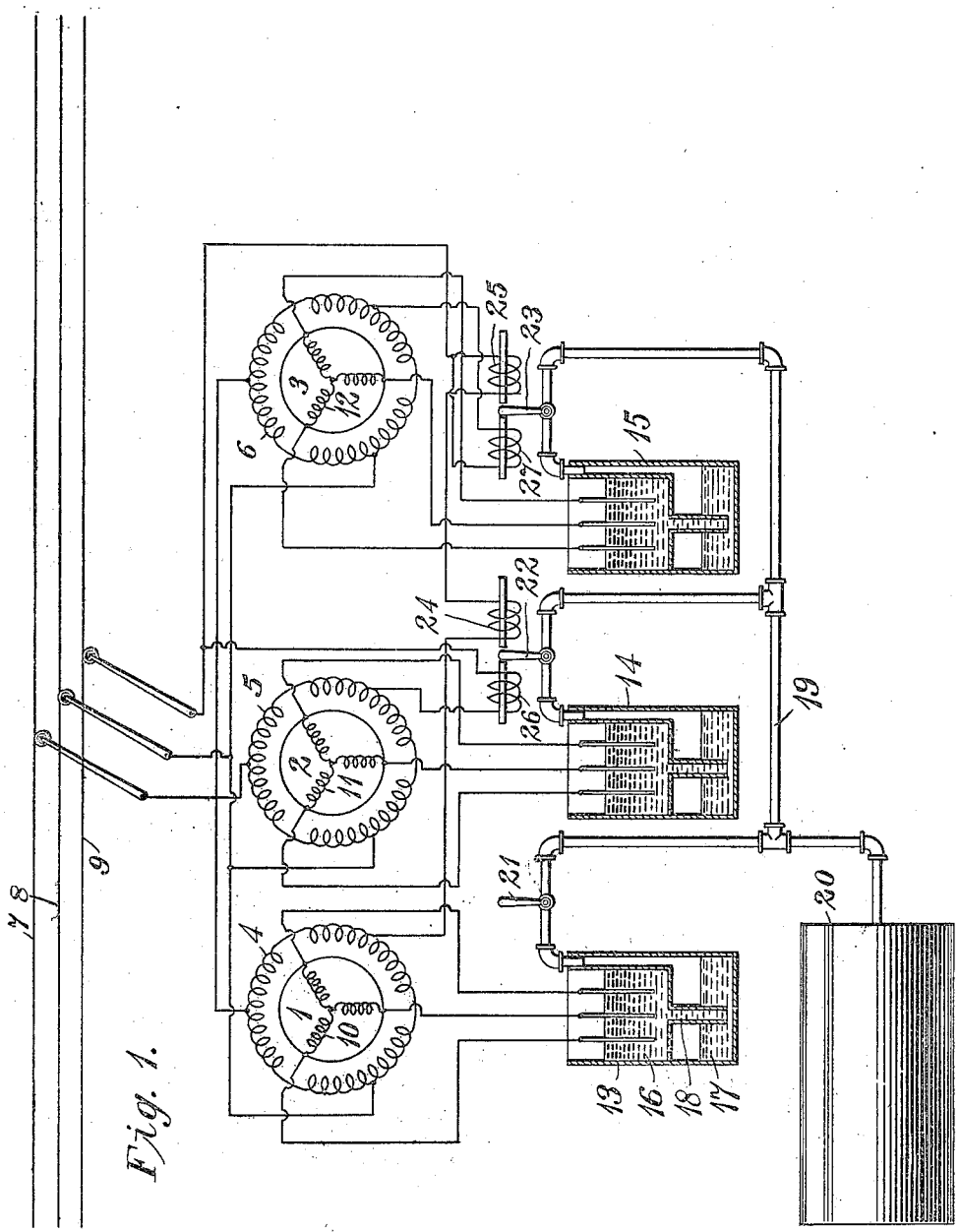

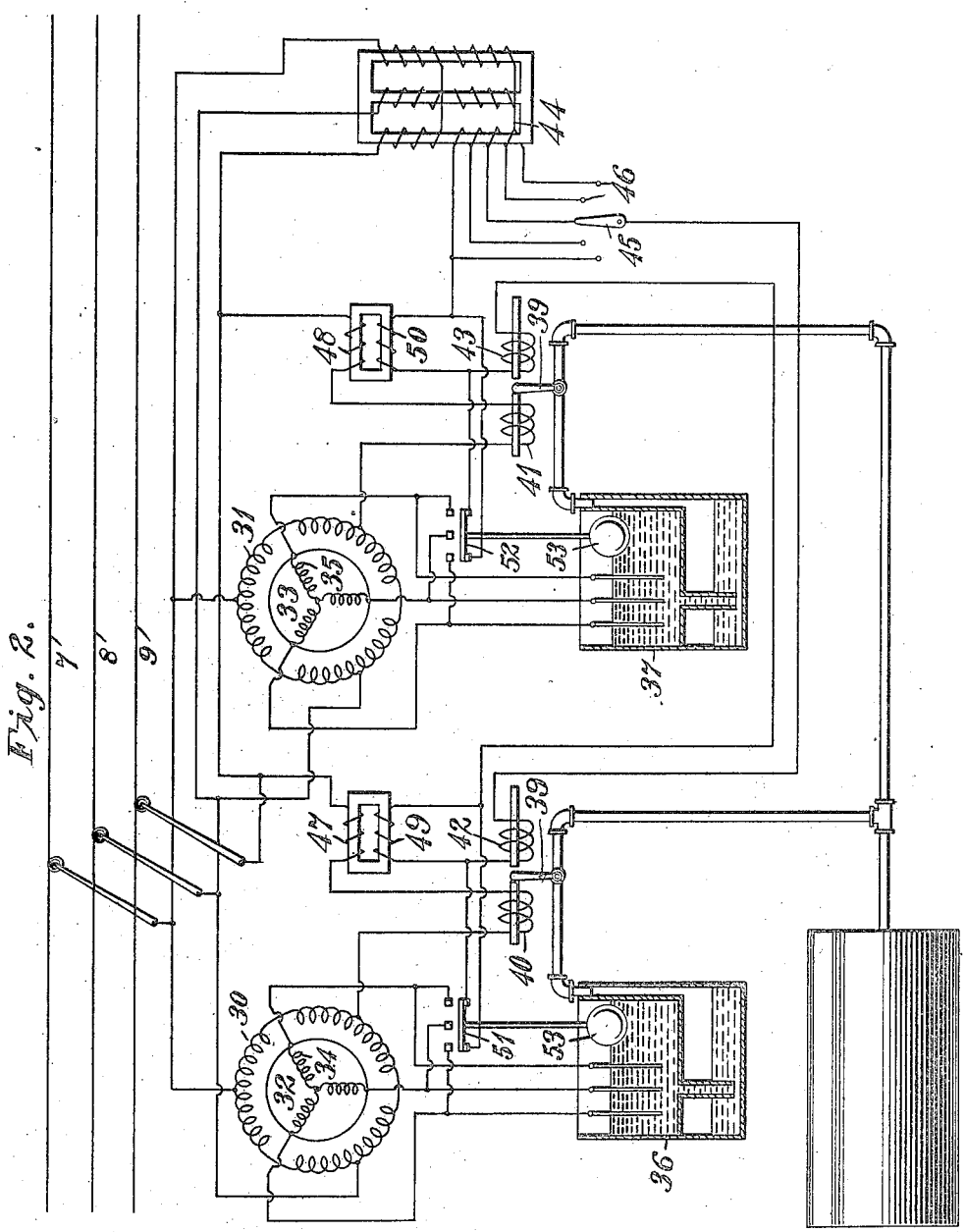

COLOMAN DE KANDÓ, OF BUDAPEST, AUSTRIA-HUNGARY, ASSIGNOR TO GEORGE WESTINGHOUSE, OF PITTSBURG, PENNSYLVANIA.

REGULATING MEANS FOR ELECTRIC MOTORS.

989,609.      Specification of Letters Patent.      Patented Apr. 18, 1911.

Application filed September 26, 1907, Serial No. 394,757. Renewed July 26, 1909. Serial No. 509,702.

*To all whom it may concern:*

Be it known that I, COLOMAN DE KANDÓ, a subject of the Emperor of Austria-Hungary, and a resident of Budapest, Austria-Hungary, have invented a new and useful Improvement in Regulating Means for Electric Motors of which the following is a specification.

My invention relates to the regulation of electric motors, and particularly to the regulation of polyphase induction motors.

The object of my invention is to provide means for causing a plurality of motors that are employed to propel a railway vehicle or train, or for other similar purposes, to operate under substantially the same conditions of load, irrespective of the speed.

Under certain conditions of operation, as, for instance, when the several driving wheels of a vehicle or train are of different diameters, the propelling motors will tend to run at different speeds, so that, during acceleration, one or more of the motors may attain full speed before the remaining motors, and the loads upon the motors will, therefore, not be equal. In order to cause a plurality of motors that are operating under similar conditions to take substantially equal loads, or to produce any other desired distribution of the load upon the motors, I propose to regulate the current supplied to all but one of the motors in response to variations in the amount of current supplied to the remaining motor.

Figure 1 of the accompanying drawings is a diagrammatic view of a system of distribution that embodies my invention, and Fig. 2 is a similar view of a modification of the system of Fig. 1.

The system of Fig. 1 comprises three polyphase induction motors 1, 2 and 3, having primary windings 4, 5 and 6, respectively, supplied from a suitable distributing circuit, such as trolley conductors 7, 8 and 9 of a railway system, and having secondary windings 10, 11 and 12, in circuit with which are included variable resistance devices 13, 14 and 15, respectively, here shown as of the water-rheostat type, though other suitable resistance may be employed instead.

Each of the rheostats 13, 14 and 15 comprises two compartments 16 and 17, the one above the other, that are connected by means of a vertical pipe 18, and the height of the water in the upper compartment 16 is regulated by varying the pressure upon the surface of the liquid in the lower compartment 17, the lower compartments of the rheostats being connected, by means of pipes 19, with a suitable reservoir or source 20 of compressed air or other fluid.

The supply of compressed fluid to the lower compartment of the rheostat 13 is governed by means of a manually-operated valve 21, and the supply of fluid-pressure to the respective lower compartments of the rheostats 14 and 15 is governed by means of valves 22 and 23. The valves 22 and 23 are, in turn, governed in operation by electromagnetic devices comprising magnet windings 24 and 25 connected in series circuit with each other and with one of the connections between the primary winding of the motor 1 and the supply circuit 7—8—9. The said devices also comprise magnet windings 26 and 27 that are included, respectively, in series circuit with one of the connections to each of the primary windings 5 and 6 of motors 2 and 3, the magnetizing effects of the windings 26 and 27 opposing those of the windings 24 and 25, respectively, and tending to close the valves 22 and 23, whereas the windings 24 and 25 act to open said valves.

In order to cause acceleration of the motors, the valve 21 is opened to admit fluid-pressure to the lower compartment of the rheostat 13, which thereby causes a decrease in amount of resistance included in the secondary circuit of the motor 1. The current supplied to the primary winding of the motor 1, through the magnet windings 24 and 25, therefore increases in amount and causes the latter to operate the valves 22 and 23 to admit fluid-pressure to the lower compartments of the rheostats 14 and 15. The resistances in the secondary circuits of the motors 2 and 3 are thereupon decreased and the currents supplied to the primary windings of the said motors increase correspondingly. The currents traversing the windings 26 and 27 also increase and, when the said currents equal that traversing the windings 24 and 25, the valves 22 and 23 will be moved to cut off or limit the supply of fluid-pressure to the lower compartments of the rheostats 14 and 15. Thus, the currents supplied to the motors 2 and 3 are maintained substantially equal to that supplied to the motor 1, irrespective of the differences of the speeds of operation of the said motors. Of course, by suitably proportioning the relative numbers of ampere turns in the windings 24 to 27, inclusive, the motors may be caused to operate under other desired conditions of load and, if different in capacity, may be caused to take loads in the ratio of their capacities.

In the system shown in Fig. 2, primary windings 30 and 31 of induction motors 32 and 33, respectively, are supplied, as in Fig. 1, from a suitable distributing circuit 7—8—9, and the amounts of resistances included in the circuits of secondary windings 34 and 35 of the motors are governed by means of water-rheostats 36 and 37 that are similar in construction and operation to rheostats 13, 14 and 15 of Fig. 1. The supply of fluid-pressure to the respective lower compartments of the rheostats 36 and 37 is governed by means of valves 38 and 39, which are, in turn, governed by electro-magnetic devices comprising magnet windings 40 and 41 that are included, respectively, in circuit with the connections of the primary windings 30 and 31 to the conductor 9. The said electro-magnetic devices also comprise magnet windings 42 and 43 connected in series relation and supplied with variable amounts of current from a subdivided transformer winding 44 that derives its energy from a distributing circuit 7—8—9. The amount of current supplied to the windings 42 and 43 is governed by means of a manually-operated switch arm 45 adapted to engage contact terminals 46 that are connected to the several points of subdivision of the transformer winding 44. Also included in the connections of the primary windings 30 and 31 to the conductor 9 are the primary windings 47 and 48 of two series transformers, the secondary windings 49 and 50 of which are included in series circuit with the magnet windings 42 and 43, but are shunted by means of switches 51 and 52 during acceleration of the motors. The switches 51 and 52 are actuated by means of floats 53 within the water-rheostats 36 and 37 to short-circuit the secondary windings of the motors when all of the resistances have been removed from the circuits thereof, whereupon the shunt circuits to the transformer windings 49 and 50 are interrupted.

In accelerating the motors, the switch arm 45 is moved from right to left over the contact terminals 46 as the currents in the secondary circuits of the motors decrease. If the motors are employed upon a railway vehicle and there is a difference in the diameters of the driving wheels to which they are connected, one of the motors may attain full speed before the other, in which event the secondary winding would become short-circuited before that of the motor last to attain full speed. This will be understood if it is assumed that the motor 32 attains full speed before the motor 33, so that the current traversing the winding 40 becomes less than that traversing the winding 41, and the valve 38 will be opened to such an extent that the level of the liquid in the upper compartment of the rheostat 36 rises more rapidly than that in the rheostat 37, and the switch 51 is thereby moved to its uppermost position in advance of a corresponding movement of the switch 52. When the switch 51 is raised, the shunt to the secondary transformer winding 49 is removed and the said winding is thereupon included in series circuit with the magnet winding 43, and the current traversing the magnet winding 43 is thereafter determined by the amount of current supplied to the primary winding of the motor 32, the switch arm 45 being then preferably in engagement with the contact terminal 46 farthest to the left. Thus, when the motor 32 attains full speed, the amount of current supplied to the primary winding of the motor 33 will be governed in response to variations in the amount of current traversing the primary winding of the motor 32. The same effect upon the operation of the motor 32 would be caused if the motor 33 attained full speed before the motor 32.

It will be understood that the devices here shown are only illustrative of suitable means that may be employed for the purpose, and that others differing in structure and mode of operation may be employed without altering the mode of operation of the system as a whole or departing materially from the spirit of the invention, and I desire that all such modifications shall be included within its scope.

I claim as my invention:

1. The combination with a plurality of electric motors, of electro-magnetically controlled devices which respond to variations in the amount of current supplied to one motor for governing the amounts of current supplied to the remaining motors.

2. The combination with a plurality of electric motors, of electro-magnetically controlled devices which respond to variations in the amount of current supplied to one motor for maintaining the current supplied to the respective motors substantially equal in amount.

3. The combination with a plurality of electric motors, and regulating resistances therefor, of electro-magnetically controlled devices which respond to variations in the amount of current supplied to one motor for governing the amounts of resistance included in the circuits of the remaining motors.

4. The combination with a plurality of electric motors, and means for regulating the speeds of operation thereof, of means whereby the current supplied to one of the motors, after attaining full speed, effects regulation of the amounts of current supplied to the remaining motors.

5. The combination with a plurality of electric motors, of means responsive to variations in the amount of current supplied to one motor, after it attains a predetermined speed, for governing the amounts of current supplied to the remaining motors.

6. The combination with a plurality of induction motors having primary and secondary windings, resistances in circuit with the secondary windings of the motors, of means responsive to variations in the amount of current supplied to the primary winding of one of the motors for governing the amounts of resistance in the secondary circuits of the remaining motors.

7. The combination with a plurality of induction motors having primary and secondary windings, and resistances in circuit with the secondary windings thereof, of means responsive to variations in the amount of current supplied to the primary winding of one of said motors, after it attains a predetermined speed, for governing the amounts of resistance in the secondary circuits of the remaining motors.

8. The combination with a plurality of induction motors and means for controlling said motors simultaneously and for automatically adjusting the relative torques of said motors.

9. The combination with a plurality of induction motors, and resistances for the secondary circuits thereof, of means for controlling said resistances simultaneously, and means for automatically adjusting the relative effective values thereof, said latter means including a portion of the former.

10. The combination with a plurality of induction motors and means for controlling said motors simultaneously and for automatically adjusting the relative torques of said motors in accordance with the difference in the amounts of current supplied to the motors.

11. The combination with a plurality of induction motors, and resistances for the secondary circuits thereof, of means for controlling said resistances simultaneously, and means for automatically adjusting the relative effective values thereof in accordance with the difference in the amounts of current supplied to the motors, said latter means including a portion of the former.

12. The combination with a plurality of induction motors, of means responsive to variations in the amount of current supplied to one motor for automatically governing the amounts of current supplied to the remaining motors.

13. The combination with a plurality of induction motors, of means responsive to variations in the amount of current supplied to one motor for automatically maintaining the current supplied to the respective motors substantially equal in amount.

14. The combination with a plurality of induction motors, of means responsive to variations in the amount of current supplied to one motor for automatically governing the amounts of resistances included in the secondary circuits of the remaining motors.

In testimony whereof, I have hereunto subscribed my name this 22nd day of August, 1907.

COLOMAN de KANDÓ.

Witnesses:
PATRIN MANTERO,
GIACOMO PIGNOLO.